(12) United States Patent
Mignot et al.

(10) Patent No.: US 10,254,000 B2
(45) Date of Patent: *Apr. 9, 2019

(54) DEVICE AND A SYSTEM FOR CONTROL AND/OR COMMAND

(71) Applicant: SOMFY SAS, Cluses (FR)

(72) Inventors: Pierre Mignot, Chateauraoux-les-Alpes (FR); Pierre Emmanuel Cavarec, Mont Saxonnex (FR)

(73) Assignee: SOMFY SAS, Cluses (FR)

( * ) Notice: Subject to any disclaimer, the term of this patent is extended or adjusted under 35 U.S.C. 154(b) by 95 days.

This patent is subject to a terminal disclaimer.

(21) Appl. No.: 15/306,699

(22) PCT Filed: Apr. 16, 2015

(86) PCT No.: PCT/FR2015/051030
§ 371 (c)(1),
(2) Date: Oct. 25, 2016

(87) PCT Pub. No.: WO2015/162360
PCT Pub. Date: Oct. 29, 2015

(65) Prior Publication Data
US 2017/0059193 A1    Mar. 2, 2017

(30) Foreign Application Priority Data
Apr. 25, 2014  (FR) ..................... 14 53728

(51) Int. Cl.
*G05B 21/00*    (2006.01)
*G01M 1/38*    (2006.01)
(Continued)

(52) U.S. Cl.
CPC .............. *F24F 11/62* (2018.01); *F24F 11/30* (2018.01); *G05B 15/02* (2013.01);
(Continued)

(58) Field of Classification Search
CPC .. F24F 11/30; F24F 11/52; F24F 11/54; F24F 11/63; G05B 15/02; B60K 2350/96
(Continued)

(56) References Cited

U.S. PATENT DOCUMENTS

2004/0267385 A1* 12/2004 Lingemann ............ G05B 15/02
   700/83
2005/0252984 A1* 11/2005 Ahmed ................... F24F 11/30
   236/51
(Continued)

FOREIGN PATENT DOCUMENTS

EP    0437993 A1    7/1991
WO   2006082939 A1  8/2006
WO   2007027632 A2  3/2007

OTHER PUBLICATIONS

International Search Report dated Jul. 15, 2015 re: Application No. PCT/FR2015/051030; pp. 1-3.

*Primary Examiner* — Mohammad Ali
*Assistant Examiner* — Md Azad
(74) *Attorney, Agent, or Firm* — Cantor Colburn LLP (57) ABSTRACT

A device for control and/or command of a visual or thermal comfort element or security element of a building includes a display screen, and an electronic control unit provided with a communication module arranged so as to receive data, according to a wireless communication protocol, originating from a complementary communication module of a central entity arranged so as to control and/or command the at least one visual or thermal comfort element or security element. The central entity is arranged to employ and transmit to the electronic control unit representative data relating to the visual or thermal comfort to electrical consumption or to the security of the building. The electronic control unit generates a display configuration based on at least one datum of content and at least one display descriptive datum defining (Continued)

the arrangement of a display of the at least one datum of content.

11 Claims, 5 Drawing Sheets

(51) Int. Cl.
    *G05B 13/00*     (2006.01)
    *G05D 23/00*     (2006.01)
    *G05D 9/00*     (2006.01)
    *F24F 11/62*     (2018.01)
    *G05B 15/02*     (2006.01)
    *F24F 11/30*     (2018.01)
    *F24F 11/63*     (2018.01)
    *F24F 11/54*     (2018.01)
    *F24F 11/52*     (2018.01)

(52) U.S. Cl.
    CPC ............ *B60K 2350/96* (2013.01); *F24F 11/52* (2018.01); *F24F 11/54* (2018.01); *F24F 11/63* (2018.01); *G05B 2219/14087* (2013.01); *G05B 2219/15045* (2013.01); *G05B 2219/15117* (2013.01); *G05B 2219/2614* (2013.01); *G05B 2219/2642* (2013.01)

(58) Field of Classification Search
    USPC ......................................................... 700/278
    See application file for complete search history.

(56) References Cited

U.S. PATENT DOCUMENTS

| | | | |
|---|---|---|---|
| 2007/0084937 A1* | 4/2007 | Ahmed | F24F 11/0008 236/44 C |
| 2010/0106809 A1 | 4/2010 | Grohman | |
| 2013/0083012 A1 | 4/2013 | Han et al. | |
| 2013/0090767 A1* | 4/2013 | Bruck | F24F 11/0086 700/276 |
| 2014/0310594 A1* | 10/2014 | Ricci | H04W 48/04 715/702 |

* cited by examiner

DEVICE AND A SYSTEM FOR CONTROL AND/OR COMMAND

TECHNICAL FIELD

The present disclosure concerns a device, a system and an installation for commanding and/or controlling at least one element for visual or thermal comfort or for security of a building.

BACKGROUND

It is known to provide a command and/or control system comprising a central entity and a plurality of command points of actuators of equipments of the building.

The central entity is arranged so as to control, that is to say at least to collect a set of data related to the visual or thermal comfort, to the electrical consumption or to the security of the building, and possibly to command, that is to say to elaborate and/or transmit a command order of an actuator. Each command point may also operate independently and elaborate command orders towards the actuator with which said command point is associated or paired.

Under these conditions, each command point may be provided with a screen arranged so as to display the data at the disposal of the command point. Typically, it includes command orders sent to the associated actuator, the response of the actuator to this command order sent to the command point and possibly a measured value received from a sensor associated to the command point.

These arrangements give satisfaction to the extent that the user can know the data related to each command point. Nonetheless, the user has to move from one command point to another command point in order to know all the data of interest to him or to configure the complex associations between the different sources of information and the command point provided with a screen.

Another solution involves transmitting all the data related to the visual or thermal comfort, to the electrical consumption or to the security of the building towards a mobile communication terminal, such as a telephone or a tablet. This arrangement gives satisfaction to the extent that all data are accessible to the user. Equipping all rooms with a terminal disposed at a fixed and visible location of a room in order to display the pieces of information regarding the considered room seems to be expensive as well as barely appropriate. Alternatively, complex navigation functions may be provided on the terminal, so as to visualize all retrievable data, but their use requires learning and may causes discontents.

The present disclosure aims to solve all or part of the aforementioned drawbacks.

SUMMARY

To this end, the present disclosure concerns a device for commanding and/or controlling an element for visual or thermal comfort or for security of a building, comprising a display screen and an electronic control unit provided with a communication module arranged so as to receive data, according to a wireless communication protocol, from a complementary communication module of a central entity arranged so as to command and/or control the at least one element for visual or thermal comfort or for security, said central entity being arranged so as to provide and emit towards the electronic control unit representative data related to the visual or thermal comfort, to the electrical consumption or to the security of the building.

The electronic control unit is configured to generate a display configuration based on at least one content datum and on at least one display descriptive datum defining the arrangement of a display of the at least one content datum, the at least one content datum and the at least one display descriptive datum being comprised in the representative data related to the visual or thermal comfort, to the electrical consumption or to the security of the building received via the communication module, the display screen being configured to display said display configuration.

Thus, the command and/or control device turns out to be a simple element. It is arranged so as to receive data, and then generate a display configuration from the representative data.

As example, the content data DC correspond to values of physical quantities related to the visual or thermal comfort, to the electrical consumption or to the security such as for example a value of the temperature or of the relative humidity, of insulation, historical data related to physical quantities, such as the electrical consumption or data related to the operation of different equipments for visual or thermal comfort or for security of the building, such as for example operating states of a heating equipment, open or closed states of a door or of a portal, etc.

The display descriptive data DD comprise data defining the arrangement of a display configuration and defining for example the division of the display configuration into areas and the content data to be displayed in each area, the representation format of the content data, for example in the form of a numerical display, of an icon to be selected in a predefined list, or still of a graph, such as for example a histogram.

The command and/or control device acts as a device for displaying the content data comprised in the representative data.

The device has not to carry out an energy-consuming treatment because no complex calculation has to be carried out for the display. The display descriptive data contain the parameters necessary to define the arrangement of the display of the content data on the screen. This allows minimizing the energy consumption necessary for the operation of the command and/or control device.

According to one aspect of the disclosure, the electronic control unit is configured to generate a display configuration based on characteristic data of the display screen, in particular characteristic data regarding the dimensions of the display screen.

In particular, these arrangements allow adapting the display to the specificities and to the positioning of the screen. Thus, a screen disposed with its largest dimension orientated horizontally should present a display configuration different from a screen the largest dimension of which is positioned vertically.

According to one aspect of the disclosure, the orientation of the display screen is defined by means of an accelerometer.

According to one aspect of the disclosure, the electronic control unit is arranged so as to elaborate and transmit a request to the central entity via the communication module, the request comprising a demand for update of at least one representative datum or a demand for action by the central entity.

In order to limit the energy consumption of the command and/or control device, it is possible that the central entity sends a representative datum only on explicit demand of the command and/or control device via a request.

The fact of supplying data to the command and control device only on request contributes to the reduction of the energy consumption of the command and/or control device, as its communication module has not to be permanently held in a message listening mode.

According to one aspect of the disclosure, it includes, when sending the request, in asking the central entity for an update of at least part of the data to be displayed. The central entity proceeds to the elaboration of the display configuration of the representative data based on the request.

According to one aspect of the disclosure, requests are emitted systematically at specific time periods. These requests may be emitted without any intervention of a user. The frequency of emission of these requests is supplied by the central entity.

According to one aspect of the disclosure, the command and/or control device further comprises an input module and a transfer module, the input module being arranged so as to detect an action of a user and the transfer module being arranged so as to transmit an entered piece of information corresponding to the detected action to the communication module of the electronic control unit.

The input module and the transfer module constitute an interface for the user which allows using directly the command and/or control device for input rather than the central entity.

According to one aspect of the disclosure, a request is emitted via the communication module once the input module detects an action of a user.

The command and/or control device then acts as a command unit of the central entity. The entered piece of information corresponding to the action of a user is transferred by the command and/or control device towards the central entity, without any other analysis. The fact of simply transferring the entered piece of information also contributes to the reduction of the energy consumption of the command and/or control device, to the extent that the resources intended for the treatment of the piece of information may be reduced.

According to one aspect of the disclosure, the input module comprises at least one area for detecting a mechanical press disposed facing the screen, the detection area being arranged so as to detect a press on the screen.

This arrangement gives an impression of a tactile screen with instantaneous feedback. In fact, the entered piece of information is transferred to the central entity and the resulting display is that of content data of a representative datum coming from the central entity.

According to one aspect of the disclosure, the input module comprises a mechanical switch. According to another aspect of the disclosure, the control unit comprises a printed circuit substrate on which is disposed the input module provided with a tactile dome.

According to one aspect of the disclosure, the screen comprises a bi-stable display element, in particular an electronic-ink display element.

The use of a bi-stable display element, in particular an electronic-ink display element allows a low energy consumption. According to one aspect of the disclosure, the display is bi-stable, that is to say that the display can be modified only if a new content is displayed.

According to one aspect of the disclosure, the communication module comprises a passive member arranged so as to be detected and identified according to a near-field communication protocol.

This arrangement allows a pairing of a command and/or control device with the central entity, for example. Indeed, the representative data identified by the command and/or control device have been elaborated for a particular command and/or control device. This pairing is necessary in order to establish the communication between the central entity and the command and/or control device. No other pairing of the command and/or control device, in particular with another equipment of the installation, is then necessary.

According to another possibility, a user provided with a mobile communication terminal arranged so as to communicate according to the near-field communication protocol, such as a telephone, is also capable of detecting and identifying the passive member. Hence, pairing may also be carried out via a terminal also arranged so as to communicate with the central entity.

According to one aspect of the disclosure, the electronic control unit is configured to present a first operating mode, during which a complete or partial update of the representative data is carried out according to a first refresh rate, and a second operating mode, during which an update of the representative data is carried out according to a second refresh rate higher than the first refresh rate.

The first operating mode corresponds to a normal operating mode, during which the first refresh rate for example corresponds to a refresh period in the range of several minutes, in particular 10 min. In particular, these periodical refreshes are carried out on the device request, so as to avoid having to permanently look for the arrival of a message. The second operating mode corresponds in particular to a start-up operating mode. It may be provided for a higher second refresh rate in order to allow a quicker display response when the display is gripped by the user. As example, the second refresh rate may correspond to a refresh rate shorter than 1 s and in particular in the range of a few hundreds of ms. The start-up second operating mode may be initialized on the initiative of the central entity. The switch from the start-up second operating mode back to the so-called normal first operating mode may be triggered for example at the end of a predetermined time period.

The present disclosure also concerns a system for commanding and/or controlling at least one element for visual or thermal comfort or for security of a building comprising at least one element for visual or thermal comfort or for security, in particular an actuator of a movable equipment of the building, a sensor for measuring a physical quantity or any other element related to the visual or thermal comfort or to the security of the building.

The system comprises a central entity arranged so as to command and/or control the at least one element for visual or thermal comfort or for security.

The system comprises a command and/or control device as previously described, arranged so as to receive data, according to a wireless communication protocol, from a complementary communication module of a central entity.

According to one aspect of the disclosure, the central entity is arranged so as to receive according to a first format data from a wide area network, in particular from the Internet network.

This arrangement allows transferring pieces of information available in the wide area network on the command and/or control device, the central entity taking on the creation of the display descriptive data related to the format of the pieces of information to be displayed.

Preferably, the central entity is arranged so as to receive according to a second format pieces of information from a local broadcast unit arranged so as to emit within a determined effective range within which the central entity is located.

Thus, the central entity receives and translates pieces of information received locally when it is located within the effective range of the local broadcast unit. The central entity may also be arranged so as to select the pieces of information to display among the pieces of information coming from the wide area network and/or from the local broadcast unit.

According to one aspect of the disclosure, the local broadcast unit is arranged so as to emit pieces of information by radio waves, preferably according to a conventional radio-frequency protocol, for example by frequency modulation and/or a «long range» or «LoRa» protocol allowing a data transmission within a radius of a few kilometers.

On the contrary of the pieces of information coming from the wide area network, the pieces of information coming from the local broadcast unit may correspond to pieces of information which are useful to the persons which are located within the effective range.

Thus, the formation of a traffic jam on a road under works, a reminder of a meeting organized for the inhabitants of a building block are examples of local pieces of information which are of interest to the persons who are within the effective range.

According to one aspect of the disclosure, the central entity comprises an emitter/receiver arranged so as to detect and identify a passive member of a command and/or control device.

The present disclosure further concerns a method for commanding and/or controlling at least one element for visual or thermal comfort or for security of a building, comprising the following steps:
  emitting representative data related to the thermal or visual comfort, to the electrical consumption and to the security of the building from a central entity arranged so as to command and/or control at least one element for visual or thermal comfort or for security according to a wireless communication protocol, the representative data comprising at least one content datum and at least one display descriptive datum defining the arrangement of a display of the at least one content datum,
  receiving, via a communication module of a command and/or control device, the representative data emitted by the central entity, and generating a display configuration based on the at least one content datum and the at least one display descriptive datum comprised in the representative data,
  displaying said display configuration on a screen of the command and/or control device.

According to one aspect of the disclosure, the method further comprises a step of sending a request towards the central entity, said request comprising a demand for update of at least one representative datum to be displayed and/or a demand for action by the central entity, such as a command order to an actuator or an order for launching a pilot scenario of an equipment for visual or thermal comfort or for security.

This arrangement allows using the command and/or control device as a remote control of the central entity. The command and/or control device only takes on the transfer of said request towards the central entity. Only the central entity proceeds to the treatment of the request.

According to one aspect of the disclosure, the method comprises a preliminary step of pairing between the command and/or control device and the central entity.

According to one aspect of the disclosure, the pairing step comprises an identification of the command and/or control device including detecting and identifying a passive member of said device according to a near-field communication protocol.

BRIEF DESCRIPTION OF THE DRAWINGS

Anyway, the disclosure will be better understood from the description which follows, made with reference to the appended schematic drawings representing, as a non-limiting example, an embodiment of these command and/or control device and system.

DETAILED DESCRIPTION OF THE DRAWINGS

Figure 1:
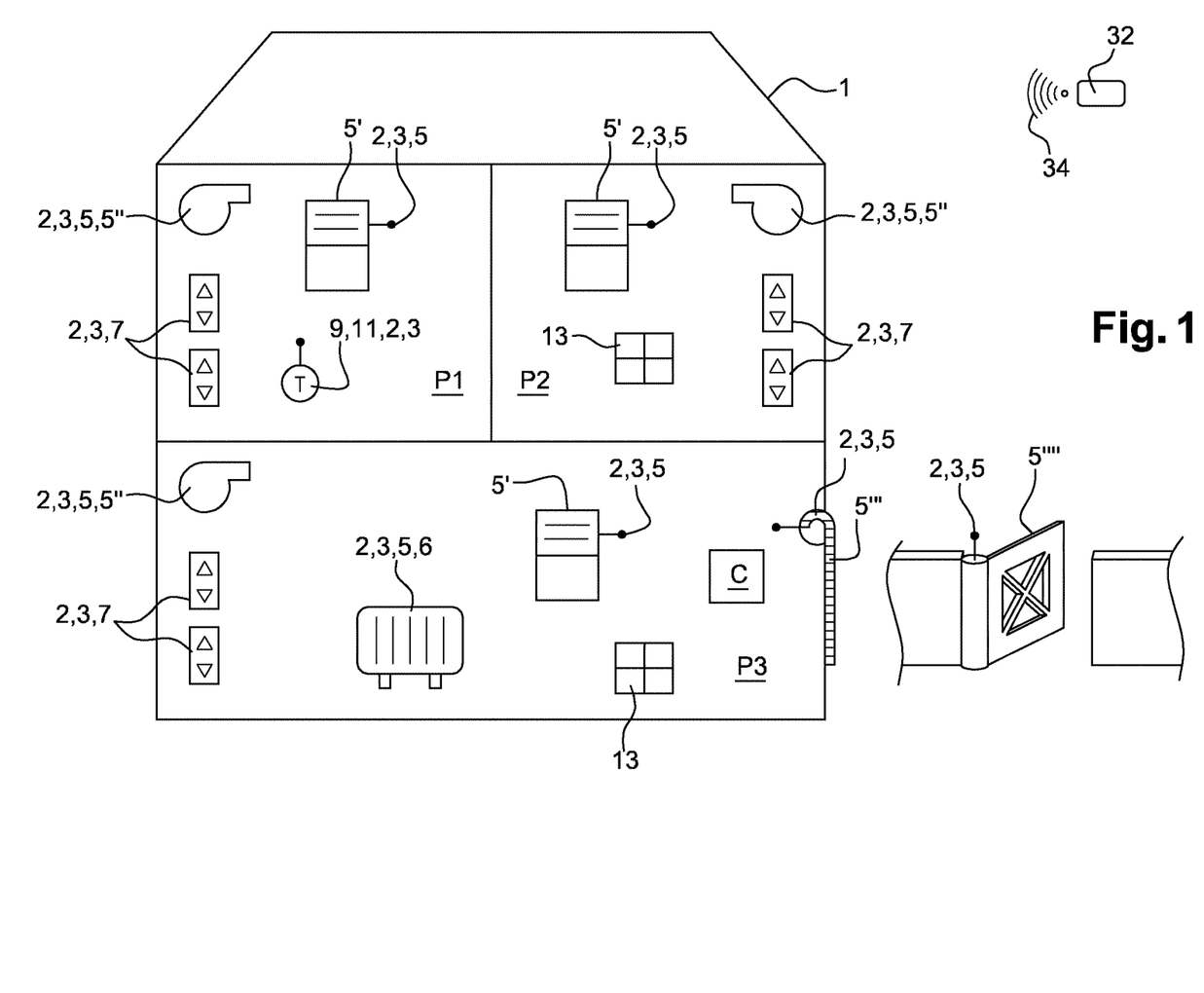
FIG. 1 is a schematic view of a building and of its environment comprising a command and/or control system.

As illustrated in FIG. 1, a building 1 comprises several rooms P1, P2, P3 and a system 2 for commanding and/or controlling a plurality of elements 3 for visual or thermal comfort or for security of the building 1 and its environment.

In the presented embodiment, the elements 3 for visual or thermal comfort or for security comprise actuators 5, command points 7 of said actuators 5 or sensors 9. These elements belong to a home automation installation.

In the present text, the term actuator 5 refers to a device allowing acting, electrically and/or mechanically, on an equipment of a building, such as a shutter, a portal, a garage door, a heater, a light fixture, an air-conditioning apparatus in order to modify its state. The actuator comprises a command receiver allowing it to receive an automatic or manual command order, for example, derived from a sensor or from a user command.

According to one example, an actuator may comprise an electric motor arranged for opening and closing a movable equipment 5' of the building such as a shutter or a window, the command order corresponding to an operating setpoint of said shutter or said window, for example an order for changing its position or its state. According to another example, an actuator 5 may comprise an aeraulic apparatus 5". Similarly, an actuator may comprise an electric motor, a pneumatic or hydraulic cylinder, a heating resistor or a heater 6, a lamp or an electromagnet. According to other examples, an actuator may comprise a motor of a garage door 5''' or still a motor of a portal 5''''.

Each command point 7 is arranged so as to emit a command order towards at least one actuator 5 subsequently to an action of the user on the command point or subsequently to the detection of a passage of a predetermined threshold of a physical quantity measured by the command point or by a sensor associated to this command point. A command order corresponds to an operation setpoint of said actuator 5. The actuator associated or paired to the command point from which the command order comes and receiving this command order reacts by modifying its state or its position of use.

Thus, it turns out that an actuator 5 and a command point 7, associated to each other, are capable of operating independently from the other actuators 5.

In the present text, the term sensor 9 refers to a device for measuring a physical quantity, for example a quantity related to a surrounding physical parameter, such as a temperature sensor 11.

The command and/or control system 2 also comprises a central entity C arranged so as to exchange data with the elements 3 for visual or thermal comfort or for security according to a wireless communication protocol. In the presented embodiment, the used protocol is a radio-frequency communication protocol, in particular bidirectional.

The central entity C comprises a treatment unit arranged so as to collect and treat the data coming from the elements 3 for visual or thermal comfort or for security. The collected data correspond to measurements of physical values, coming from the sensors 9, or to command orders of an actuator 5 coming from the command points 7. They may also comprise confirmation pieces of information, coming from the actuators 5, subsequently to a command order, said feedback pieces of information indicating the receive of the command order and/or the state or the position of operation of the actuator 5 reached in response to the command order. They may also include a command order of a user entered at the level of the central entity C, the command order involving, for example, closing a shutter.

The treatment unit is arranged so as to elaborate command or control orders towards the elements 3 for visual or thermal comfort or for security, based on the data it is provided with. Thus, although each command point 7 is capable of operating independently, the central entity C acts as a global command and control system in order to ensure a coherence between all the command points of the building. This coherence may be ensured by proposing to the user different scenarios for piloting the elements for visual or thermal comfort or for security, a scenario may include sentences such as «I leave home» or «I close the shutters by nightfall». For this purpose, the central entity stores pieces of information regarding the different elements for visual or thermal comfort or for security of the building, as well as pairing relationships with these elements and with the command and/or control system.

Figure 2:
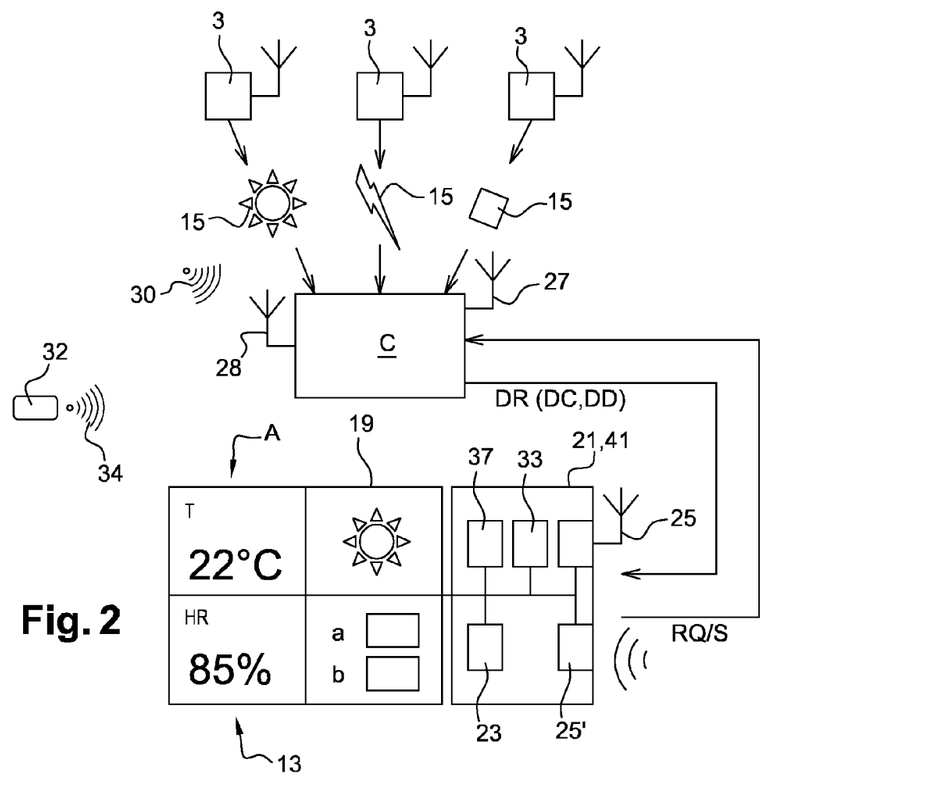
FIG. 2 is a synoptic diagram of the command and/or control system.

Furthermore, as illustrated in FIG. 2, the central entity C comprises an additional communication module 28 which is arranged so as to receive pieces of information or data according to a wireless communication mode.

The additional communication module 28 is arranged so as to receive according to a first format pieces of information from a wide area network 30. This wide area network 30 may correspond to the Internet network and may be accessible in the building via wifi.

The additional communication module 28 is also arranged so as to receive according to a second format pieces of information from a local broadcast unit 32 emitting within a determined effective range.

The central entity C is located within the determined effective range. The local broadcast unit 32 is arranged so as to emit pieces of information and transmit them according to a «long range» radio-frequency communication protocol 34.

These pieces of information or data received from the wide area network 30 and from the local broadcast unit 32 are transmitted to the treatment unit of the central entity C.

The command and/or control system 2 further comprises at least one command and/or control device 13. The command and/or control device 13 is arranged so as to display pieces of information related to the command and/or control system 2 and also to transmit requests towards the central entity C, as explained hereinbelow.

In FIG. 2, there are represented the data 15 received by the central entity C from the elements 3 for visual or thermal comfort or for security, in particular data from luminosity sensors, command orders and feedback pieces of information from actuators 5. There are also represented representative data DR related to visual or thermal comfort, to electrical consumption or to security exchanged between the central entity and the command and/or control devices, the used communication protocol being the radio-frequency communication protocol.

The command and/or control device 13 comprises a screen 19 and an electronic control unit 21, the electronic control unit 21 being arranged so as to exchange data with the central entity C. The command and/or control device 13 comprises a power-supply module 23 provided with batteries.

The display configuration A visible in FIG. 2 is simple and presents the content data DC in the form of text and/or symbols. According to the presented example, the display configuration A is split into several distinct areas. Of course, the number of these areas may be variable.

According to one embodiment, the screen 19 is arranged so as to function with electronic ink. The advantage of electronic ink is to allow a bi-stable display: once a content is displayed, it remains displayed, even in the absence of electric power supply by the power-supply module 23. According to other embodiments, other types of bi-stable displays may be used, for example using microelectromechanical systems (MEMS), based on interference modulations (IMoD).

The electronic control unit 21 comprises a communication module 25 arranged so as to exchange data with a complementary communication module 27 of the central entity C according to a radio-frequency communication protocol. In practice, each of the communication module 25 and the complementary communication module 27 comprises a radio emitter-receiver.

The communication module 25 further comprises a passive member 25' adapted to receive data according to a near-field communication protocol. In turn, the complementary communication module 27 comprises an emitter arranged so as to communicate according to this near-field communication protocol. The interest of disposing two communication modes between the central entity C and the command and/or control device 13 will be detailed later on.

The electronic control unit 21 is configured to generate a display configuration A based on the content data DC and the display descriptive data DD defining the arrangement of a display of the at least one content datum DC, the at least one content datum DC and the at least one display descriptive datum DD being comprised in the representative data DR related to the visual or thermal comfort, to the electrical consumption or to the security of the building 1 received via the communication module 25.

The display screen 19 is configured to display said display configuration A.

The electronic control unit 21 is also arranged so as to elaborate and transmit a request RQ towards the central entity C. The elaborated request may comprise a demand for update of a representative datum to be displayed.

In practice, the electronic control unit is arranged so as to ask the central entity C for updates of the content to be displayed. This update is sent depending on the needs. The central entity C determines a piece of information on the frequency which is transmitted to the command and/or control device: may be taken into account for example the hour, because it is not necessary for example to refresh the display too often at night, or a piece of information on the presence or absence in the building or its environment.

Figure 5:
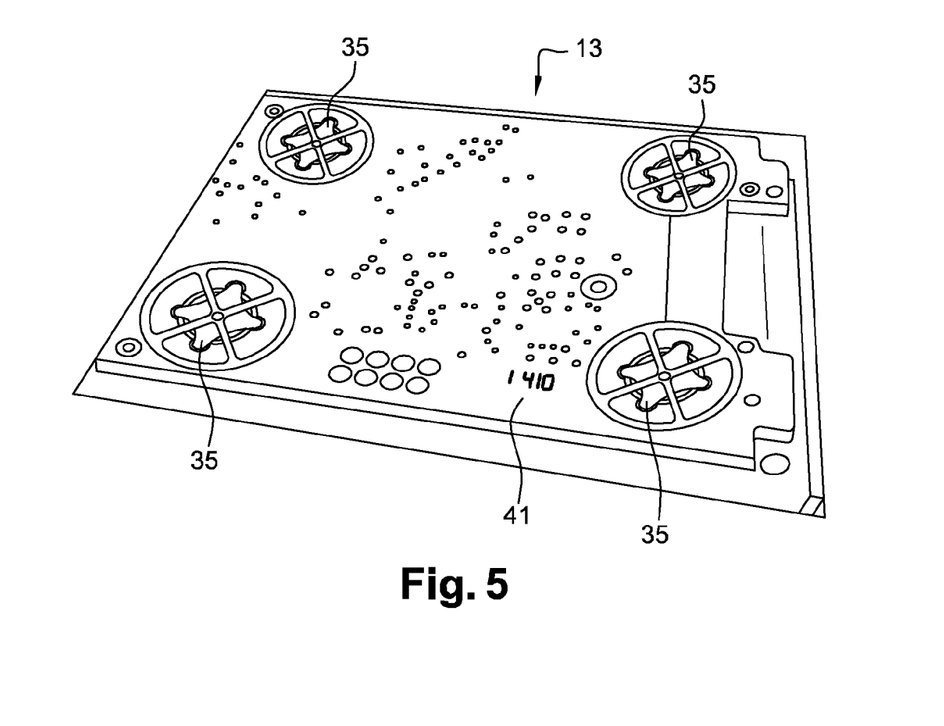
FIG. 5 is a perspective view of the inside of the command and/or control device.
Figure 6:
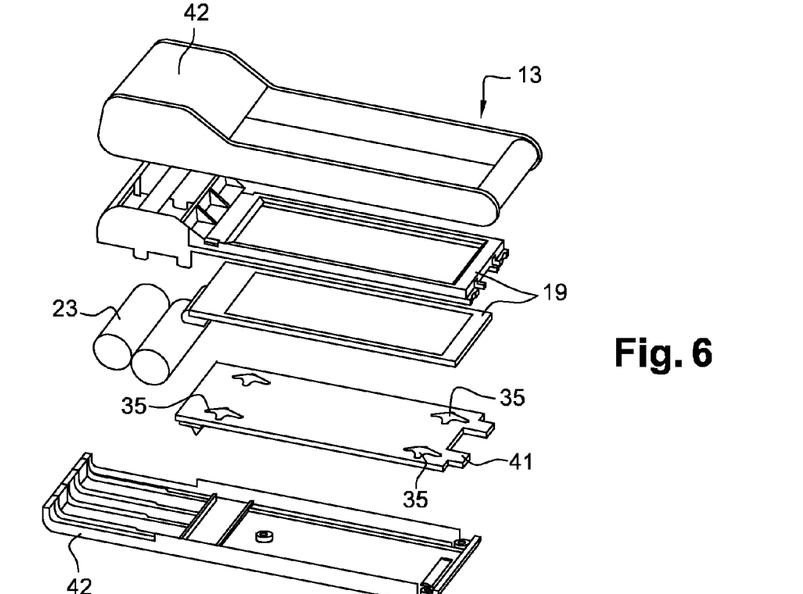
FIGS. 6 to 8 are exploded views of the command and/or control device.

The electronic control unit 21 comprises an input module 33 provided with several areas for detecting presses. To do so, the input module 33 comprises four mechanical switches 35 disposed below the screen 19, as illustrated in FIGS. 5 and 6. Thus, the areas correspond to portions of the surface of the screen: a pseudo-tactile effect is therefore obtained. FIG. 6 presents the inside of the command and/or control device 13 when the screen 19 is removed.

The mechanical switches 35 comprise tactile domes mounted on a printed circuit 41 facing the screen. Each mechanical switch 35 is identified by a reference. It is also possible to press simultaneously on two mechanical switches 35. A tactile dome may also be provided at the center of the printed circuit.

Figure 3A:
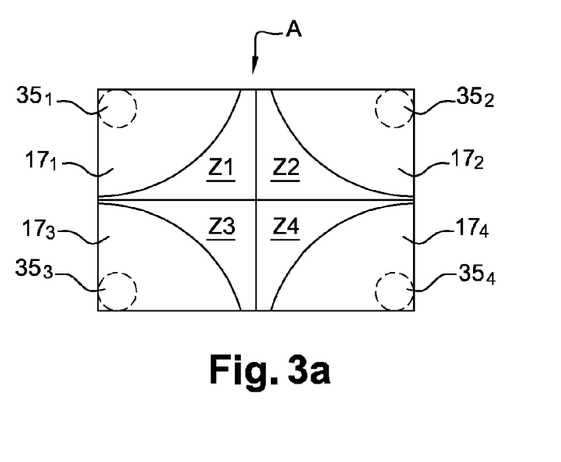
FIGS. 3a and 3b are schematics of two display configurations according to two orientations of the display screen.

According to the embodiment described in FIGS. 5 and 6, four switches 35 are positioned at the four corners of the screen, below the latter and it is thus possible to detect presses on the areas 17 located at the corners of the screen. These areas $17_1$, $17_2$, $17_3$, $17_4$, are illustrated in FIG. 3a. They are respectively disposed above the four switches $35_1$, $35_2$, $35_3$, $35_4$, substantially corresponding to four display areas Z1, Z2, Z3, Z4. Thus, the device allows detecting a press of the user on a display area of a given display configuration A.

In FIG. 2, the screen 19 comprises four areas presenting different pieces of information: the instantaneous temperature in a room of the building 1, the relative humidity in said room, a weather piece of information and a view of the evolution of the temperature setpoint in said room over twenty-four hours.

Figure 7:
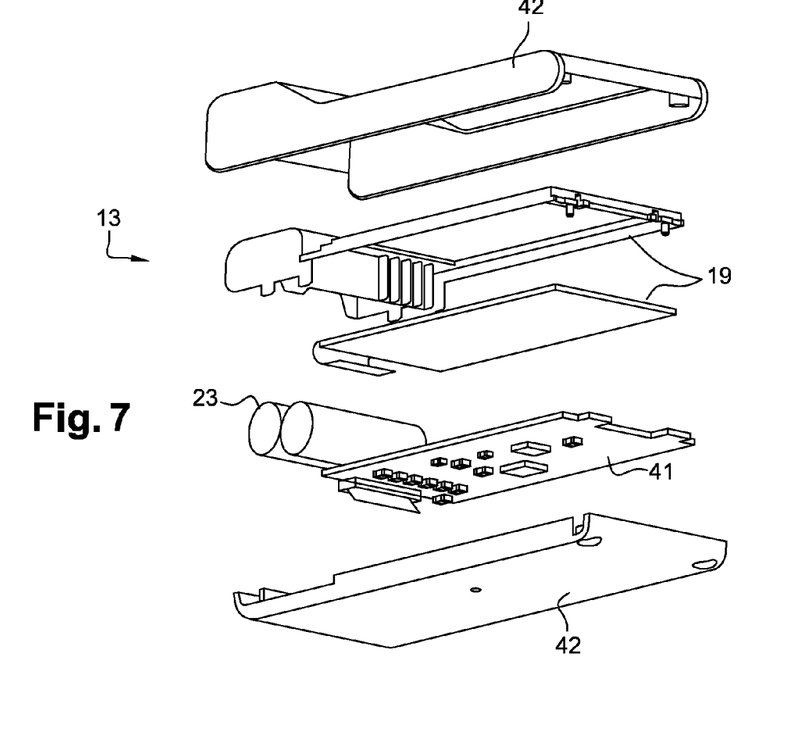
Figure 8:
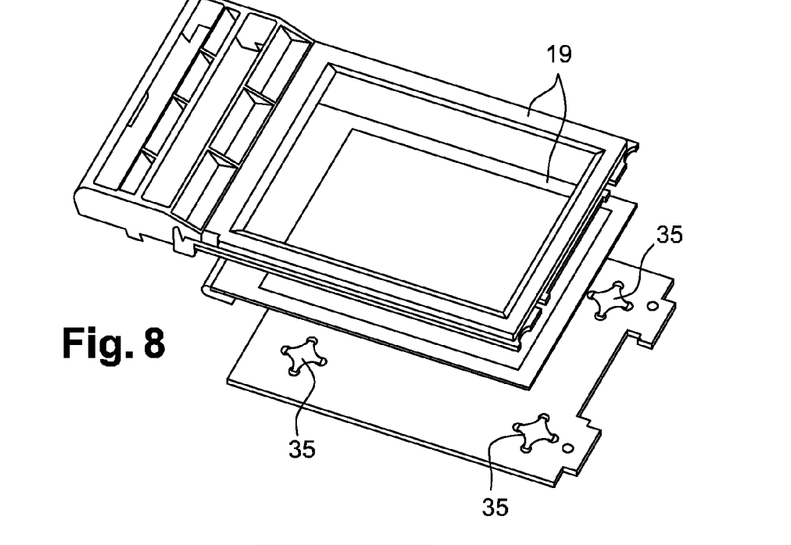

FIGS. 6 to 8 are complete or partial exploded views of the command and/or control device 13. As represented, the command and/or control device 13 further comprises a casing 42 composed of an upper portion and of a lower portion.

As illustrated in FIG. 2, the electronic control unit 21 comprises a transfer module 37 arranged so as to transmit the references of the mechanical switches 35 on which the user has pressed. The electronic control unit 21 further comprises an accelerometer allowing detecting whether the screen 19 is positioned rather vertically or horizontally. Moreover, the electronic control unit 21 comprises a physical measurements sensor (not represented). The data supplied by this physical measurements sensor may be displayed directly on the screen of the electronic control unit 21. They may also be supplied to the central unit C.

Finally, the electronic control unit 21 is arranged so as to coordinate the operation of the communication module 25, the input module 33 and the transfer module 37. In particular, the electronic control unit 21 comprises the printed circuit 41 mentioned hereinbefore, a microprocessor and a memory.

Figure 9:
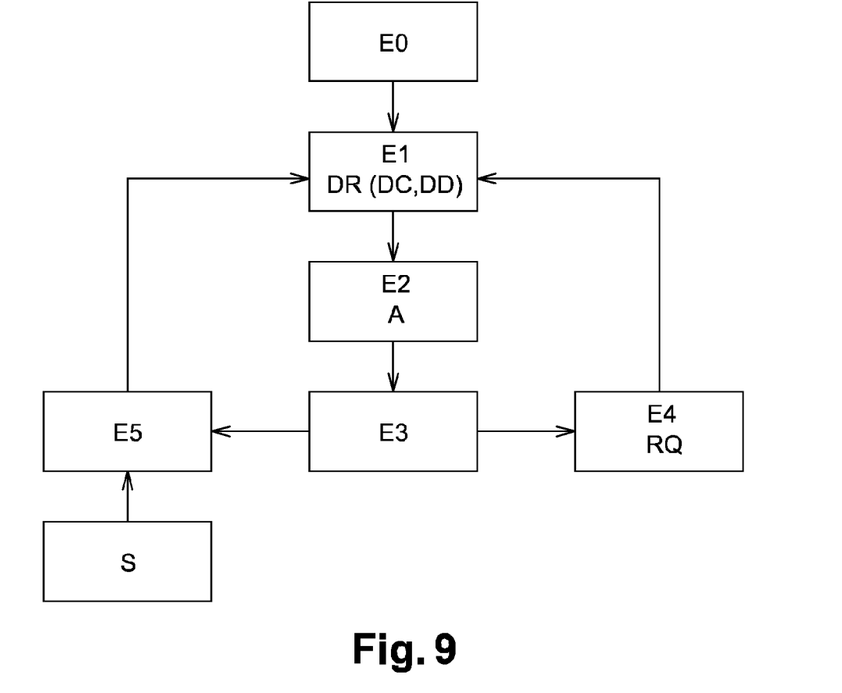
FIG. 9 is a flow chart of the steps of a command and/or control method.

The operation and more particularly the interaction between the central entity C and the command and/or control device 13 are schematically represented in FIG. 9 according to a flow chart detailing the different steps of the command and/or control method.

A preliminary step E0 comprises pairing the command and/or control device 13 to the central entity C. The central entity C is arranged so as to emit data related to the visual or thermal comfort, to the electrical consumption or to the security of the building 1. However, as long as pairing is not carried out, the central entity C cannot send representative data intended to the command and/or control device 13.

Hence, pairing includes establishing a communication between the communication module 25 and the complementary element 27 so that the central entity C could identify the command and/or control device 13. This communication may be carried out according to the radio-frequency or near-field communication protocol.

The advantage of the near-field communication mode is to enable detecting the passive element 25' when the latter is proximate to the complementary communication module 27.

Once the central entity C has identified the command and/or control device 13, the pairing step may optionally comprise a configuration substep. The configuration includes for the central entity C in sending data to the communication module 25 with the aim of setting the piece of information feedback element.

The piece of information feedback element may then be set so that it regularly sends requests for obtaining some pieces of information (temperature of a room, weather of the current day for example or other available pieces of information from the wide area network or from the local broadcast unit such as the formation of a traffic jam due to works nearby the building).

The setting also comprises the definition of the refresh rate of the display. The refresh may be more spaced at night. The setting corresponds to automating the sending of requests by the piece of information feedback element.

According to one embodiment, in a normal first operating mode, a refresh of the pieces of information, may be provided for according to a first refresh rate, for example corresponding to a refresh period of 10 min. These periodical refreshes are carried out on the display request, so as to avoid having to permanently look for the arrival of a message. In a second operating mode, corresponding in particular to a start-up operating mode, it may be provided for a second refresh rate higher than the first refresh rate, in order to allow a quicker display response when the display is gripped by the user. As example, the second refresh rate may correspond to a refresh rate shorter than 1 s and in particular in the range of a few hundreds of ms. The start-up second operating mode may be initialized on the initiative of the central entity C, for example subsequently to the creation of a new interface arrangement (layout), or on a demand for a piece of information feedback. The switch from the start-up second operating mode back to the so-called normal first operating mode may be triggered for example at the end of a predetermined time period.

The preliminary step E0 may be carried out only once when putting the command and/or control system 2 in operation. The preliminary step E0 may also be carried out independently from the other steps of the method. Indeed, a change of the settings is always possible. This step may also be carried out by a communication terminal, such as a telephone, comprising an emitter operating according to the near-field communication protocol. The terminal has to be paired beforehand with central entity C, so as to enable transmitting the pieces of information received according to the near-field communication protocol to the central entity. Thus, the terminal is used as an intermediary: all it does is transmit data.

It is also possible to memorize a setting profile in the treatment unit of the central entity and to load this setting profile on several command and/or control devices 13. For this operation, a communication terminal may also be used.

The first step E1 actually includes emitting representative data from the central entity C towards the paired command and/or control device 13 according to the radio-frequency communication protocol. Each representative datum comprises content data and a display piece of information.

The representative data may comprise pieces of information from the comfort elements 3 but also from the wide area network 30 and from the local broadcast unit 32.

This arrangement allows transmitting to the command and/or control device 13 pieces of information from the Internet network such as the weather and/or local pieces of information such as the reminder of an upcoming meeting of the co-owners of the building via the local broadcast unit 32.

The second step E2 includes the command and/or control device 13 in receiving via the communication module 25 the representative data sent by the central entity C, and then generating a display configuration A based on the at least one content datum DC and the at least one display descriptive datum DD comprised in the representative data DR.

The display descriptive data DD detail the arrangement of the display: The treatment of the data by the command and/or control device is therefore limited: the device generates the images based on the received content and according to the specified arrangement.

The content data DC correspond to simple elements such as a text, a numerical value or a reference of an element known by the electronic control unit 21. For example, the content corresponds to a value of the temperature T or of the relative humidity RH measured in the room, the content may also comprise the number or the name a, b of a scenario.

In an operating mode, the sent representative data DR do not comprise images in the form of a set of pixels. If icons have to be used, these are stored locally in a memory of the electronic control unit. In this case, the display descriptive data contain a simple reference to the icon that has to be used in the display configuration A.

Based on the supplied content data DC and display descriptive data, the command and/or control device generates the images corresponding to the display configuration.

The third step E3 includes the command and/or control device 13 in displaying on the screen 19 the content data DC of the representative data DR according to the defined display configuration A.

It is to be noted that this arrangement allows obtaining a low energy consumption by the command and/or control device 13. The transmitted data are small in size in comparison with images in the form of a set of pixels. It does not require a complex treatment unit for treating the content data with the view of displaying it to the extent that the arrangement is also supplied by the central entity.

Figure 3B:
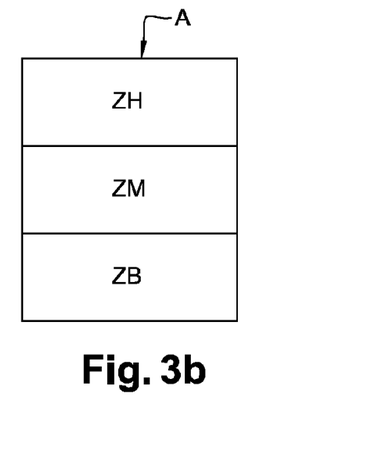
Figure 4:
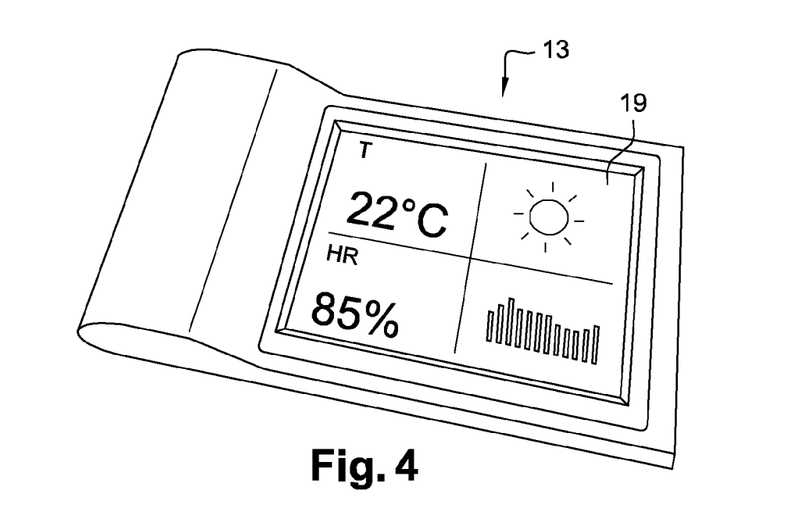
FIG. 4 is a perspective view of the command and/or control device.

Nonetheless, the electronic control unit 21 comprising the accelerometer is used during this step to define whether the display should be performed vertically or horizontally, as illustrated in FIGS. 3a and 3b. FIG. 3a illustrates a horizontal display with 4 areas Z1, Z2, Z3, Z4 similar to that of FIG. 2. FIG. 3b illustrates a vertical display with 3 areas, top H, middle M and bottom B, distributed over the height. In such a case, either the command and/or control device requires an update of the arrangement and/or the content data of the representative data DR to be displayed and of the pieces of information when changing the positioning, or the display descriptive data DD contain data corresponding to both formats at each request. The command and/or control device then selects the relevant format when changing the vertical or horizontal positioning of the screen 19 of the device.

The fourth step E4 comprises the command and/or control device 13 in sending a request RQ towards the central entity C. As already mentioned, this request aims to ask the central entity C to send at least one updated representative datum DR. Hence, the aim of sending this request RQ is to refresh the display of the screen 19. Herein again, the fact of conditioning the refresh of the screen 19 by the emission of a request by the command and/or control device 13 contributes to the low energy consumption of the device.

The fifth step E5 comprises the command and/or control device 13 in detecting an input of a user S at the input areas and in transferring the references of the areas on which the user has pressed to the central entity C. During this step, the command and/or control device 13 does not carry out any data analysis, all it does is relay the piece of information towards the central entity C. The fifth step E5 is optional and may be carried out in parallel with the other steps.

Hence, the command and/or control device 13 may also act as a remote control of the central unit C. This remote control may be used to transmit a choice of a scenario or the increase/decrease of a temperature setpoint value for example. The user may have a pseudo-tactile impression although the command order of the user is analyzed only by the central entity C.

Thus, the command and/or control device 13 turns out to be an inexpensive dynamic display point. The command and/or control device 13 informs the user and allows him to act on the other elements 3 for visual or thermal comfort or for security of the building 1 via the central entity C.

According to one embodiment, the command and/or control device 13 is comprised in a casing 42 on which a magnet is attached. Thus, it is easy to displace the command and/or control device 13 and to dispose it on or against an internal element of the building 1. The reduced cost of the command and/or control device 13 allows providing for using several command and/or control devices 13 for the same building 1.

According to one embodiment which is not represented, the command and/or control device may also allow displaying a code identifying an element of the installation, such as a two-dimensional code (barcode or QR-code). Afterwards, this code may be entered by an appropriate reader, for example a code reader integrated in a smartphone or in a tablet.

It goes without saying that the disclosure is not limited to the sole embodiment of these command and/or control device and system, described hereinabove as example, but it encompasses on the contrary all variants thereof.

The invention claimed is:

1. A device for commanding and/or controlling an element for visual or thermal comfort or for security of a building, the device comprising:
   a display screen, and
   an electronic control unit provided with a communication module arranged so as to receive data, according to a wireless communication protocol, from a complementary communication module of a central entity arranged so as to command and/or control the at least one element for visual or thermal comfort or for security, said central entity being arranged so as to provide and emit towards the electronic control unit representative data related to the visual or thermal comfort, to the electrical consumption or to the security of the building, and the electronic control unit being configured to generate a display configuration based on at least one content datum and on at least one display descriptive datum defining the arrangement of a display of the at least one content datum, the at least one content datum and the at least one display descriptive datum being comprised in the representative data related to the visual or thermal comfort, to the electrical consumption or to the security of the building received via the communication module, the display screen being configured to display said display configuration, wherein the at least one display descriptive datum defines a division of the display configuration into areas and the at least one content datum to be displayed in each of said areas, wherein the at least one display descriptive datum defines a representation format of the at least one content datum in the form of a numerical display, of an icon to be selected in a predefined list, or of a graph, wherein the electronic control unit is configured to present a first operating mode, during which an update of the representative data is carried out according to a first refresh rate, and a second operating mode, during which an update of the representative data is carried out according to a second refresh rate higher than the first refresh rate.

2. The command and/or control device according to claim 1, wherein the electronic control unit is configured to generate a display configuration based on characteristic data of the display screen, in particular characteristic data regarding the dimensions of the display screen.

3. The command and/or control device according to claim 1, wherein the electronic control unit is arranged so as to elaborate and transmit a request to the central entity via the communication module, the request comprising a demand for update of at least one representative datum or a demand for action by the central entity.

4. The command and/or control device according to claim 1, further comprising an input module and a transfer module, the input module being arranged so as to detect an action of a user and the transfer module being arranged so as to transmit an entered piece of information corresponding to the detected action to the communication module of the electronic control unit.

5. The command and/or control device according to claim 4, wherein the input module comprises at least one area for detecting a mechanical press disposed facing the screen, the detection area being arranged so as to detect a press on the screen.

6. The command and/or control device according to claim 1, wherein the screen comprises a bi-stable display element, in particular an electronic-ink display element.

7. The command and/or control device according to claim 1, wherein the communication module comprises a passive member arranged so as to be detected and identified according to a near-field communication protocol.

8. A system for commanding and/or controlling at least one element for visual or thermal comfort or for security of a building, comprising:
at least one element for visual or thermal comfort or for security, in particular an actuator of a movable equipment of the building, a sensor for measuring a physical quantity or any other element related to the visual or thermal comfort or to the security of the building,
a central entity arranged so as to command and/or control the at least one element for visual or thermal comfort or for security,
a device for commanding and/or controlling an element for visual or thermal comfort or for security of the building, arranged so as to receive data, according to a wireless communication protocol, from a complementary communication module of the central entity, the device comprising:
a display screen, and
an electronic control unit provided with a communication module arranged so as to receive data, according to the wireless communication protocol, from the complementary communication module of the central entity arranged so as to command and/or control the at least one element for visual or thermal comfort or for security, said central entity being arranged so as to provide and emit towards the electronic control unit representative data related to the visual or thermal comfort, to the electrical consumption or to the security of the building, and
the electronic control unit being configured to generate a display configuration based on at least one content datum and on at least one display descriptive datum defining the arrangement of a display of the at least one content datum, the at least one content datum and the at least one display descriptive datum being comprised in the representative data related to the visual or thermal comfort, to the electrical consumption or to the security of the building received via the communication module, the display screen being configured to display said display configuration, wherein the at least one display descriptive datum defines a division of the display configuration into areas and the at least one content datum to be displayed in each of said areas, wherein the at least one display descriptive datum defines a representation format of the at least one content datum in the form of a numerical display, of an icon to be selected in a predefined list, or of a graph, wherein the electronic control unit is configured to present a first operating mode, during which an update of the representative data is carried out according to a first refresh rate, and a second operating mode, during which an update of the representative data is carried out according to a second refresh rate higher than the first refresh rate.

9. A method for commanding and/or controlling at least one element for visual or thermal comfort or for security of a building, the method including the following steps:
emitting representative data related to the thermal or visual comfort of the building from a central entity arranged so as to command and/or control at least one element for visual or thermal comfort or for security according to a wireless communication protocol, the representative data comprising at least one content datum and at least one display descriptive datum defining the arrangement of a display of the at least one content datum, wherein the at least one display descriptive datum defines a division of a display configuration into areas and the at least one content datum to be displayed in each of said areas, wherein the at least one display descriptive datum defines a representation format of the at least one content datum in the form of a numerical display, of an icon to be selected in a predefined list, or of a graph, receiving, via a communication module of a command and/or control device, the representative data emitted by the central entity, and generating the display configuration based on the at least one content datum and the at least one display descriptive datum comprised in the representative data (DR), and displaying said display configuration on a screen of the command and/or control device, wherein the control device is configured to present a first operating mode, during which an update of the representative data is carried out according to a first refresh rate, and a second operating mode, during which an update of the representative data is carried out according to a second refresh rate higher than the first refresh rate.

10. The command and/or control method according to claim 9, comprising a preliminary step of pairing between the command and/or control device and the central entity.

11. The command and/or control method according to claim 10, wherein, the pairing step comprises an identification of the command and/or control device including the step of detecting and identifying a passive member of said device according to a near-field communication protocol.

* * * * *